United States Patent
Hojo et al.

(10) Patent No.: US 6,863,910 B2
(45) Date of Patent: Mar. 8, 2005

(54) INORGANIC PARTICLES-CONTAINING ADDITIVE COMPOSITION, MANUFACTURING METHOD THEREOF AND FOOD COMPOSITION CONTAINING THE ADDITIVE COMPOSITION

(75) Inventors: Hisakazu Hojo, Hyogo (JP); Naoki Kubota, Hyogo (JP); Yoshimasa Morisaki, Hyogo (JP)

(73) Assignee: Maruo Calcium Company Limited, Akashi (JP)

( * ) Notice: Subject to any disclaimer, the term of this patent is extended or adjusted under 35 U.S.C. 154(b) by 177 days.

(21) Appl. No.: 10/046,277

(22) Filed: Jan. 16, 2002

(65) Prior Publication Data

US 2003/0118694 A1 Jun. 26, 2003

(30) Foreign Application Priority Data

Oct. 16, 2001 (JP) .................................. 2001-317872

(51) Int. Cl.$^7$ ................................................ A23L 4/18
(52) U.S. Cl. .................... 426/74; 426/580; 426/590; 426/599
(58) Field of Search .................... 426/74, 590, 580, 426/599

(56) References Cited

U.S. PATENT DOCUMENTS 4,214,996 A    7/1980  Buddemeyer et al.
5,489,440 A  * 2/1996  Ndife et al. ................. 424/489
6,248,376 B1 * 6/2001  Buddemeyer et al. ......... 426/74
6,572,908 B2 * 6/2003  Kemp et al. ................. 426/335

FOREIGN PATENT DOCUMENTS

JP         7-89852     4/1995
JP         8-107772    4/1996
JP      2000-184864    7/2000

* cited by examiner

Primary Examiner—Helen Pratt
(74) Attorney, Agent, or Firm—Armstrong, Kratz, Quintos, Hanson & Brooks, LLP

(57) ABSTRACT

An inorganic particles-containing additive composition is disclosed which contains a polyvalent metal, a phosphoric acid ion, an organic acid having a carboxyl group and an alkali metal, said composition satisfying the following requirements of (a) and (b):

$$70 \leq X \leq 90000 \quad (a)$$

X: Amount (mg/Kg) of the alkali metal contained in a solid content of the additive composition, $$0.1 \leq Y \leq 15 \quad (b)$$

Y: Electric conductivity (mS/cm) when the additive composition is adjusted to a solid concentration of 10% by weight.

The additive composition is excellent not only in dispersibility and storage stability in a liquid, but also in flavor.

9 Claims, No Drawings

INORGANIC PARTICLES-CONTAINING ADDITIVE COMPOSITION, MANUFACTURING METHOD THEREOF AND FOOD COMPOSITION CONTAINING THE ADDITIVE COMPOSITION

BACKGROUND OF THE INVENTION

1. Field of the Invention

The present invention relates to an inorganic particles-containing additive composition, a manufacturing method thereof and a food composition containing the additive composition, and more particularly, to an inorganic particles-containing additive composition extremely excellent in dispersion stability as well as in flavor to be used effectively for reinforcing minerals by addition to foods such as yogurt, milk, juice, cream for coffee, powdered milk and candies, a manufacturing method thereof and a food composition containing such food additive composition.

2. Description of the Prior Art

Recently, shortage of uptake of calcium, magnesium, iron and the like is pointed out, and this tendency is prominent among growing children and elder people.

Calcium is not only important for growth of bones, but also plays a vital role for contracting and expanding muscles and maintaining the homeostasis in the body. Moreover, magnesium acts to relax and dilate the muscles and blood vessels, and it is an indispensable mineral for the human. Deficiency of magnesium is considered to lead to hypertension, angina pectoris, hyperlipidemia, and other diseases. At the same time, magnesium is closely related with metabolism of calcium, and its shortage causes various symptoms due to dysbolism. Further, magnesium is related to various enzymatic reactions, and is said to maintain the homeostasis in the body.

However, in recent years, people come to prefer European style eating habit and highly refined cereals, and the majority of magnesium is lost in the food refining process and it tends to be lacking in the eating life of the present days, and magnesium-enriched food is attracting attention lately. Further, anemia due to iron shortage is widely reported among women recently. This tendency is particularly notable among schoolgirls and young women. Asiderotic anemia is mainly attributable to eating habit, but women are more vulnerable onset of anemia by iron shortage owing to physiological menstruation, increase of iron demand due to pregnancy or shortage of uptake by extreme diet, and generally approximately half of women are in shortage of iron. To solve this iron shortage problem, iron-enriched foods have been commercially available, and milk and carbonated beverages of higher iron contents are started to be sold widely.

To compensate such shortage of uptake of various minerals, mineral-enriched foods are distributed, and even in the cow milk that is generally high in mineral contents, further minerals are added, and mineral-enriched milk products are supplied, and many other mineral-enriched products of juice and powdered milk are also on market.

In milk and yogurt, for example, with the purpose of reinforcing in minerals, water soluble inorganic or organic minerals such as calcium lactate, calcium chloride, magnesium chloride, and ammonium ferric citrate, or water insoluble inorganic minerals such as calcium carbonate, calcium phosphate, dolomite, and ferric pyrophosphoric acid are added and used. However, water soluble inorganic or organic minerals are likely to impair the stability of protein in the milk or yogurt, and it is hard to contain more than a certain amount, and they cannot be used abundantly as mineral materials. Besides, the peculiar bitter taste is also a problem.

On the other hand, water insoluble inorganic minerals are not soluble in water and do not disturb the stability of protein in the milk or yogurt, and high contents can be added, but the specific gravity of inorganic minerals is generally as high as 2.1 or higher, and they sediment in a short time when dispersed in milk, and the appearance of food is inferior, and hence the amount added is limited, which results in having a drawback that they cannot be added plentifully.

Various methods have been proposed so far in order to add high contents of calcium in food by overcoming these problems, and, for example, Japanese Unexamined Patent Publication No. Hei 9-9911 discloses a method of improving the dispersion by adding at least one selected from the group consisting of phospholipids and proteolytes to calcium carbonate, and grinding in a wet process. In this method of adding phospholipids or proteolytes, however, since the phospholipids have a peculiar smell and bitterness, the problem in flavor is serious, and according to this publication, the average particle size of calcium dispersion is 1 to 3 $\mu$m, and the milk containing calcium carbonate obtained by this method is poor in the yield of calcium carbonate in the clarifier or other centrifugal classifiers in the manufacturing process, and it is likely to sediment in milk or other food products, and hence it is far from ideal for application in long-term preservative food such as long-life milk.

In Japanese Unexamined Patent Publication No. Sho 55-84327, it is proposed to obtain a mineral-enriched substance by mixing (1) a cation supply source selected from the group consisting of calcium, magnesium, iron, copper, boron, zinc, manganese, molybdenum, arsenic, silver, aluminum, barium, bismuth, mercury, nickel, lead, platinum, antimony, and tin, (2) an alkali phosphate supply source selected from the group consisting of potassium phosphate, dipotassium hydrogenphosphate, mixtures of alkali metal hydroxide and phosphoric acid, and alkali metal hydrogenphosphate, and (3) an organic acid containing at least three carboxyl groups, in the sequence of the cation supply source, the alkali phosphate supply source, and finally the organic acid source.

In the dispersion state of the food additive composition prepared in such adding sequence, according to the publication, the theoretical effective utilization rate of minerals is not always sufficient, and the milk containing the food additive composition obtained by this method is, just as in Japanese Unexamined Patent Publcaiton No. Hei 9-9911, poor in the yield of calcium compounds in the clarifier or other centrifugal classifiers in the manufacturing process, and it is likely to sediment in milk or other food products, and hence it is far from ideal for application in long-term preservative food. Moreover, the food additive composition, probably because of containing too much amount of alkali metal salts of an organic acid having a carboxyl group, lowers flavor remarkably which is caused by bitterness and stimulus when added to foods, which tends to damage quality of foods dreadfully, and thus it was not said to be a good method even in respect of flavor.

Lately, along with progress in the container and storage method capable of preserving liquid food products such as milk, yogurt and juice for a long term, more and more food products are stored for a longer period in retail shops, vending machines, and large household refrigerators, and calcium carbonate particles added in these foods for enriching calcium contents may sediment in the bottom of the food containers during long-term storage if the dispersion state in the foods is not favorable, and the sediments may give impression of discomfort or uncleanness to the consumers when taking such milk, juice and liquid food products.

Therefore, existing commercial liquid food products containing inorganic particles of calcium carbonate or the like prepared by the prior art for the purpose of enriching calcium contents are short in stable dispersion period of inorganic particles in food, and the content of inorganic particles must be limited to a minimum, and the use is limited to liquid foods to be consumed within one or two days after purchase by consumers.

SUMMARY OF THE INVENTION

In the light of this background, it is hence an object of the invention to solve these problems in the prior art, and to provide an inorganic particles-containing additive composition extremely excellent in dispersibility as well as in flavor preferably used as additives to food such as yogurt, milk, juice, cream, powdered milk and candies, a manufacturing method thereof and a food composition containing the additive composition.

A first aspect of the present invention relates to an inorganic particles-containing additive composition containing a polyvalent metal, a phosphoric acid ion, an organic acid having a carboxyl group and an alkali metal, which satisfies the requirements of (a) and (b):

$$70 \leq X \leq 90000 \tag{a}$$

X: Amount (mg/Kg) of the alkali metal contained in a solid content of the inorganic particles-containing additive composition, $$0.1 \leq Y \leq 15 \tag{b}$$

Y: Electric conductivity (mS/cm) when the inorganic particles-containing additive composition is adjusted to a solid concentration of 10% by weight.

A second aspect of the present invention relates to an inorganic particles-containing additive composition containing as a main component at least one of phosphoric acid compounds selected from the group consisting of calcium phosphate, magnesium phosphate and iron phosphate, which comprises a polyvalent metal, a phosphoric acid ion, an organic acid having a carboxyl group and an alkali metal, which is prepared by a method selected from the following (I) to (IV), said additive composition satisfying the following requirements of (a) and (b):

(I) A precursor is prepared by mixing water, a polyvalent metal compound, an organic acid having a carboxyl group and an alkali metal source, and to the precursor, a phosphoric acid source is added.
(II) A precursor is prepared by mixing water, a polyvalent metal compound, a phosphoric acid source and an alkali metal source, or, a phosphoric acid source.alkali metal source, and to the precursor, an organic acid having a carboxyl group is added.
(III) A precursor is prepared by mixing water, a polyvalent metal compound and an organic acid having a carboxyl group, and to the precursor, a phosphoric acid source.alkali metal source is added.
(IV) A precursor is prepared by mixing water, a polyvalent metal compound, an organic acid having a carboxyl group and a phosphoric acid source, and to the precursor, an alkali metal source is added.

$$70 \leq X \leq 90000 \tag{a}$$

X: Amount (mg/Kg) of the alkali metal contained in a solid content of the inorganic particles-containing additive composition, $$0.1 \leq Y \leq 15 \tag{b}$$

Y: Electric conductivity (mS/cm) when the inorganic particles-containing additive composition is adjusted to a solid concentration of 10% by weight.

A third aspect of the present invention relates to an inorganic particles-containing additive composition, further containing 2 to 80 parts by weight of an emulsification stabilizer to 100 parts by weight of a solid content of the above-mentioned inorganic particles containing additive composition.

A fourth aspect of the present invention relates to a method for manufacturing inorganic particles-containing additive composition, comprising the steps of:

preparing a slurry containing at least one phosphoric acid compound as a main component, which comprises a polyvalent metal, a phosphoric acid ion, an organic acid having a carboxyl group, and an alkali metal, by a method selected from the following (I) to (IV), and washing the resultant slurry:

(I) A precursor is prepared by mixing water, a polyvalent metal compound, an organic acid having a carbxyl group and an alkali metal source, and to the precursor, a phosphoric acid source is added.
(II) A precursor is prepared by mixing water, a polyvalent metal compound, a phosphoric acid source and an alkali metal source, or, a phosphoric acid source.alkali metal source, and to the precursor, an organic acid having a carboxyl group is added.
(III) A precursor is prepared by mixing water, a polyvalent metal compound and an organic acid having a carboxyl group, and to the precursor, a phosphoric acid source.alkali metal source is added.
(IV) A precursor is prepared by mixing water, a polyvalent metal compound, an organic acid having a carboxyl group and a phosphoric acid source, and to the precursor, an alkali metal source is added.

A fifth aspect of the present invention relates to a method for manufacturing inorganic particles-containing additive composition, wherein 2 to 80 parts by weight of an emulsification stabilizer are contained in 100 parts by weight of the inorganic particles-containing additive composition prepared by the above-mentioned method.

A sixth aspect of the present invention relates to a food composition containing the above-mentioned inorganic particles-containing additive composition.

DETAILED DESCRIPTION OF THE INVENTION

Hereinafter, the present invention will be explained in detail.

In the following description, inorganic particles-containing additive slurry composition and inorganic particles-containing additive powder composition are referred to as "inorganic particles-containing additive composition" if the both are not necessary to be distinguished from each other.

Examples of the polyvalent metal compound usable in the present invention include calcium hydroxide, magnesium hydroxide, iron hydroxide, calcium oxide, magnesium oxide, iron oxide, calcium chloride, magnesium chloride, iron chloride, calcium carbonate, magnesium carbonate, iron carbonate, calcium nitrate, magnesium nitrate, iron nitrate, calcium sulfate, magnesium sulfate, iron sulfate, calcium phosphate, magnesium phosphate, iron phosphate, ferric pyrophosphoric acid, and dolomite, and they can be used either alone or in combination of two or more. To obtain an additive composition of a superior dispersibility, it is preferred to use at least one selected from the group consisting of calcium hydroxide, magnesium hydroxide, iron hydroxide, calcium oxide, magnesium oxide, iron oxide, magnesium carbonate, calcium carbonate, iron carbonate, and dolomite.

Examples of the organic acid having a carboxyl group usable in the present invention include malic acid, succinic acid, citric acid, adipic acid, fumaric acid, glutamic acid, their alkali metal salts, and polyvalent metal salts, and they can be used either alone or in combination of two or more. To obtain a food additive composition of a superior dispersibility, it is preferred to use at least one selected from the group consisting of citric acid, potassium citrate, sodium citrate, calcium citrate, magnesium citrate, ammonium ferric citrate, iron citrate, and sodium ferrous citrate.

The phosphoric acid source usable in the present invention includes phosphoric acid and condensed phosphoric acid, and they can be used either alone or in combination of two or more. The condensed phosphoric acid includes pyrophosphoric acid, tripolyphosphoric acid, tetrapolyphosphoric acid, pentapolyphosphoric acid, and hexamethaphosphoric acid, and they can be used either alone or in combination of two or more.

The phosphoric acid source.alkali metal source usable in the present invention includes alkali metals of phosphoric acid and/or alkali metals of condensed phosphoric acid, or, phosphoric acid and/or condensed phosphoric acid and alkali metals, and more concrete examples are a sodium salt and a potassium salt of phosphoric acid, a sodium salt and a potassium salt of condensed phosphoric acid, a mixture of phosphoric acid, a sodium salt and a potassium salt, and a mixture of condensed phosphoric acid, a sodium salt and a potassium salt, and they can be used either alone or in combination of two or more.

The alkali metal source usable in the present invention includes sodium hydroxide, potassium hydroxide, sodium oxide, potassium oxide, sodium carbonate, sodium hydrogencarbonate, potassium carbonate, and potassium hydrogencarbonate, and they can be used either alone or in combination of two or more.

The inorganic particles-containing additive composition of the present invention is obtained as a slurry composition, and further obtained as a powder composition by being dried and pulverized.

In obtaining the inorganic particles-containing additive composition, at first, a slurry composition is prepared by mixing water, a polyvalent metal, an organic acid having a carboxyl group, a phosphoric acid source and an alkali metal source. The mixing method is classified into the below-mentioned (I), (II), (III) and (IV) and any one of these methods may be employed and if necessary, may be employed in combination of two or more.

(I) A precursor is prepared by mixing water, a polyvalent metal compound, an organic acid having a carboxyl group and an alkali metal source, and to the precursor, a phosphoric acid source is added.
(II) A precursor is prepared by mixing water, a polyvalent metal compound, a phosphoric acid source and a alkali metal source, or, a phosphoric acid source.alkali metal source, and to the precursor, an organic acid having a carboxyl group is added.
(III) A precursor is prepared by mixing water, a polyvalent metal compound and an organic acid having a carboxyl group, and to the precursor, a phosphoric acid source.alkali metal source is added.
(IV) A precursor is prepared by mixing water, a polyvalent metal compound, an organic acid having a carboxyl group and a phosphoric acid source, and to the precursor, an alkali metal source is added.

Meanwhile, in order to the slurry composition having a more excellent dispersibility, it is preferred to use the method (III) or (IV).

To obtain the food additive slurry composition of the present invention, the molar ratios of components at the time of preparation are preferred to be in the specified ranges. That is, the ratio of the polyvalent metal ion: the organic acid ion having a carboxyl group is in a range of 0.8:1 to 7:1, and to obtain an inorganic particles-containing additive composition of a superior dispersibility, it is preferred to be in a range of 1.8:1 to 4:1, more preferably, 1.8:1 to 2.7:1.

The ratio of the organic acid ion having a carboxyl group: the phosphoric acid ion is in a range of 1:0.6 to 1:2.8, and to obtain a food additive slurry composition of a superior dispersibility, it is preferred to be in a range of 1:1 to 1:2.4, more preferably, 1:1.3 to 1:1.85. The ratio of the organic acid ion having carboxyl group: the alkali metal ion is in a range of 1:1 to 1:8, and to obtain a food additive slurry composition of a superior dispersibility, it is preferred to be in a range of 1:1.5 to 1:5, more preferably, 1:2 to 1:4.

When the molar ratio of the polyvalent metal ion to the organic acid ion having a carboxyl group is less than 0.8, the dispersion state tends to be unstable and it is not preferable, or when the molar ratio exceeds 7, the polyvalent metal ions tends to be left in ion state, and when used in milk, for example, the stability of protein is likely to be disturbed and there is a thickening tendency, which may lead to gelation or loss of flavor in an extreme case.

If the molar ratio of the phosphoric acid ion to the organic acid having a carboxyl group is less than 0.6, the dispersion state tends to be unstable and it is not preferable, or when the molar ratio exceeds 2.8, aggregates of an inorganic polyvalent metal are likely to be formed, and when used in milk, for example, aggregates of the inorganic polyvalent metal massively sediment at the bottom of the container, which is not preferable.

If the molar ratio of the alkali metal ion to the organic acid having a carboxyl group is less than 1, the dispersion state tends to be unstable and it is not preferable, or when the molar ratio exceeds 8, the alkalinity is too strong, and when a strong alkali is added to food, the favor is sacrificed.

For the preparation of the precursor of the present invention, there is no particular limitation with respect to the sequence of mixing water, the polyvalent metal compound, and the organic acid having a carboxyl group. Moreover, with respect to the above-mentioned method (III), the addition method of the phosphoric acid source.alkali metal source is classified into (a), (b), (c) and (d) and any one of them may be employed and those may be employed in combination of two or more.

(a) Addition of an alkali metal phosphate and/or an alkali metal of condensed phosphoric acid,
(b) Simultaneous addition of an alkali metal phosphate and/or an alkali metal of condensed phosphoric acid, and an alkali metal salt,
(c) Simultaneous addition of phosphoric acid and/or condensed phosphoric acid, and an alkali metal salt, (d) Addition of an alkali metal phosphate and/or an alkali metal of condensed phosphoric acid, and then addition of an alkali metal salt.

The temperature when mixing the components for producing the inorganic particles-containing additive slurry composition of the present invention is not particularly limited, but is preferably in a range of 1 to 70° C., or more preferably 10 to 40° C. for obtaining an inorganic particles-containing additive slurry composition of a superior dispersibility. It is preferred, after mixing all components, to heat to a temperature in a range of 80 to 230° C., since the dispersion tends to be stable for a longer period.

If the liquid temperature at the time of mixing is over 70° C., coarse particles are likely to be formed in the liquid, and it is hard to maintain a stable dispersion for a long period, and if the liquid temperature is lower than 1° C., the water used as a solvent is likely to be frozen, and it is hard to obtain a composition having an excellent dispersion.

The inorganic particles-containing additive composition of the present invention is prepared by preparing a slurry containing as a main component at least one of phosphoric acid compounds, which comprises the polyvalent metal, the phosphoric acid ion, the organic acid having a carboxyl group and the alkali metal, by the method selected from the above-mentioned (I) to (IV), and washing the obtained slurry. The indispensable requirements for preparing the inorganic particles-containing additive composition of the present invention is that an amount X (mg/Kg) of an alkali metal contained in the solid content of the inorganic particles-containing additive slurry composition and an electric conductivity Y (mS/cm) when the inorganic particles-containing additive slurry composition is adjusted to a solid concentration of 10% by weight satisfy the requirements of the below-mentioned (a) and (b), preferably (c) and (d), more preferably (e) and (f):

$$70 \leq X \leq 90000 \quad \text{(a)}$$

$$0.1 \leq Y \leq 15 \quad \text{(b)}$$

$$70 \leq X \leq 39000 \quad \text{(c)}$$

$$0.1 \leq Y \leq 7 \quad \text{(d)}$$

$$150 \leq X \leq 10000 \quad \text{(e)}$$

$$0.25 \leq Y \leq 1.8 \quad \text{(f)}$$

If the amount X (mg/Kg) of the alkali metal contained in the solid content of the inorganic particles-containing additive slurry composition is less than 70, the dispersihilily tends to lower and thus it is difficult not only to obtain a stable product, but to obtain a highly concentrated product, which is not economical, and on the other hand, if it is more than 90000, a metallic odor becomes stronger when added to food. Moreover, if the electric conductivity Y (mS/cm) when the inorganic particles-containing additive slurry composition is adjusted to a solid concentration of 10% by weight is less than 0.1, the inorganic particles-containing additive composition tends to re-aggregate and when added to a drink or the like, it is difficult to obtain a stable product, on the other hand, if it is more than 15, when added to food, the flavor remarkably lowers by hitterness and stimulus so that the taste of the food is greatly damaged.

The amount X (mg/Kg) of the alkali metal contained in the solid content of the inorganic particles-containing additive slurry composition is measured and calculated in the following manner:

Measuring apparatus: Atomic absorption spectrophotometer AA-6700F of Shimadzu Corp.

Proparation of samples: About 2 g of the powdered inorganic particles-containing additive slurry composition is taken out, dissolved in 3 g of nitric acid and diluted with distilled water to 100 ml to thus obtain samples for measurment. According to the amount of the alkali metal contained therein, further dilution may be possible.

Solvent: Distilled water.

The electric conductivity Y (mS/cm) when the inorganic particles-containing additive slurry composition is adjusted to a solid concentration of 10% by weight is measured and calculated in the following manner:

Measuring apparatus: Electric conductivity tester Model SC 82 of Yokogawa Electric Corp.

Preparation of samples: The inorganic particles-containing additive slurry composition is adjusted to a solid concentration of 10% by weight to obtain samples for measurment.

Solvent: Distilled water.

The washing method of the inorganic particles-containing additive slurry composition of the present invention is not specifically limited, and a centrifugal separator such as a decanter and a clarifier, a washing machine of a filter cloth type such as a rotary filter or the like, but the centrifugal separator like a super centrifugal machine is preferred to use in washing efficiency.

The timing of washing of the inorganic particles-containing additive slurry composition is not specifically limited, and washing may be conducted either at the time of mixing the polyvalent metal, the phosphorous acid ion, the organic acid having a carboxyl group and the alkali metal, or after the mixture obtained by mixing the polyvalent metal, the phosphorous acid ion, the organic acid having a carboxyl group and the alkali metal is heated. To obtain the inorganic particles-containing additive slurry composition of a superior dispersion, the latter is preferred to use.

Although the above-mentioned inorganic particles-containing additive slurry composition [hereinafter referred to as "inorganic particles-containing additive slurry composition ($\alpha$)"] containing the polyvalent metal, the phosphorous acid ion, the organic acid having a carboxyl group and the alkali metal, which satifies the above-mentioned requirements (a) and (b) is not only extremely excellent in re-dispersibility in a liquid and storage stability for a long period in a liquid, but in the flavor, to achieve dispersion stability in an acidic region or to maintain the dispersion stability for a longer period in long-life milk, it is preferred to manufacture an inorganic particles-containing additive slurry conposition [hereinafter referred to as "inorganic particles-containing additive slurry composition ($\beta$)] by adding an emulsification stabilizer in an amount of 2 to 80 parts by weight to 100 parts by weight of a solid content of the inorganic particles-containing additive slurry composition ($\alpha$).

If the amount of the emulsification stabilizer is less than 2 parts by weight to 100 parts by weight of the solid content of the inorganic particles-containing additive slurry composition ($\alpha$), when the food additive slurry composition ($\beta$) is added and used in canned juice, drink type yogurt or similar food products, it is hard to maintain emulsion stability for a long period or to achieve dispersion stability effect in food in an acidic region, and if exceeding 80 parts by weight, the product viscosity is raised and the smoothness of drinking is sacrificed, and further as the product viscosity becomes higher, handling is difficult in manufacture at high concentrations, and the solid concentration must be lowered, which is not economical.

Examples of the emulsification stabilizer usable in the present invention include gellan gum, carrageenan, soda arginate, guar gum, gum karaya, carboxy methyl cellulose (CMC), propylene glycol ester arginate (PGA), gum arabic, tamarind gum, gum ghatti, gum tragacanth, xanthan gum, pullulan, cassia gum, locust bean gum, arabinogalactan, sclerogum, condensed phosphoric acid salts, sucrose fatty acid esters with 8 or more HLBs, polyglyceride fatty acid esters, lecithin, processed starch, and soybean polysaccharide, and they can be used either alone or in combination of two or more. To obtain dispersion stability for a longer period, it is preferred to use at least one selected from the group consisting of sucrose fatty acid ester with 8 or more HLBs, PGA, CMC, gum arabic, arabinogalactan, condensed phosphoric acid salts, polyglyceride fatty acid esters, lecithin, and processed starch.

Meanwhile, the amount X (mg/Kg) of the alkali metal contained in a solid content of the inorganic particles-containing additive slurry composition ($\beta$) and the electric conductivity Y (mS/cm) when the inorganic particles-containing additive slurry composition ($\beta$) is adjusted to a solid concentration of 10% by weight satisfy preferably the above-mentioned requirements (a) and (b), more preferably the requirements (c) and (d), still more preferably the requirements (e) and (f).

Moreover, to achieve the dispersion stability for a long period in foods like canned juice, it is preferred to add 2 to 80 parts by weight of an emulsification stabilizer to 100 parts by weight of a solid content of the inorganic particles-containing additive slurry composition ($\alpha$), then to disperse it by a grinding machine and/or dispersing machine.

The grinding machine and/or dispersing machine used in the present invention is not particularly specified, and Dyno mill, sand mill, Kovor mill, and other wet grinding machines, and ultrasonic dispersing machine, Nanomizer, Microfluidizer, Ultimizer, homogenizer and other emulsifying and dispersing machines are preferably used.

By pulverizing and drying the food additive slurry compositions ($\alpha$) and ($\beta$) prepared in the above manners, food additive powder compositions ($\alpha$) and ($\beta$) are prepared. The drying of the inorganic particles-containing additive slurry composition ($\alpha$) or ($\beta$) may be carried out either by drying a cake-like solid matter obtained by washing or by drying it after being diluted to be a slurry again, but to obtain a dried powder of a superior re-dispersibility, the latter is preferred to use. When drying the inorganic particles-containing additive slurry compositions ($\alpha$) and ($\beta$), the dryer is not particularly specified, but it is preferred to dry in a short time as far as possible from the viewpoint of prevention of degeneration of various surface treating agents, and from this viewpoint, therefore, it is preferred to use a spray dryer, a slurry dryer using a ceramic medium in heated fluid state, other liquid spray type dryers, and a vacuum dryer.

Even in the case of the inorganic particles-containing additive powder composition ($\alpha$) or ($\beta$), the requirements X and Y are the same as in the inorganic particles-containing additive slurry composition ($\alpha$) or ($\beta$). That is, X means the amount of the alkali metal (mg/Kg) contained in the inorganic particles-containing additive powder composition and Y means the electric conductivity (mS/cm) when the inorganic particles-containing additive powder composition is adjusted to a solid content of 10% by weight using water as a solvent.

In the particle size distribution of inorganic particles-containing additive composition ($\alpha$) or ($\beta$) of the present invention, the weight-average diameter K ($\mu$m) is preferred to satisfy the following condition ($\chi$) and in the food application demanding storage dispersion stability for a considerably long period, it is preferred to satisfy the condition ($\psi$), more preferably the condition ($\omega$).

$0.02 \leq K \leq 0.8$ ($\chi$)

$0.02 \leq K \leq 0.3$ ($\psi$)

$0.02 \leq K \leq 0.1$ ($\omega$)

If the weight-average diameter in the particle size distribution of inorganic particles-containing additive composition ($\alpha$) or ($\beta$) is larger than 0.8 $\mu$m, it is likely to sediment, and the additive composition ($\alpha$) or ($\beta$) cannot be used in long storage food products. If it is too small, on the other hand, the solubility of minerals tends to increase, and when added in milk, for example, the protein in the milk is likely to aggregate, and hence it is preferred to be 0.02 $\mu$m or more.

The weight-average diameter in particle size distribution of the inorganic particles-containing additive composition ($\alpha$) or ($\beta$) in the present invention is measured and calculated in the following manner:

Measuring apparatus: SA-CP4L of Shimadzu Corporation

Preparation of samples: Inorganic particles-containing additive composition ($\alpha$) or ($\beta$) is dropped in the following solvent at 20° C., and samples for measuring particle size distribution are obtained.

Solvent: Distilled water.

Preliminary dispersion: Ultrasonic dispersion for 60 seconds by using an ultrasonic homogenizer (manufactured by Nippon Seiki)

Measuring temperature: 20.0±2.5° C.

Incidentally, when water soluble inorganic or organic calcium is added in milk or other foods, soluble calcium ions are likely to impede stability of protein in the milk, and more than a specific content cannot be added, but the inorganic particles-containing additive composition ($\alpha$) or ($\beta$) in the present invention are compositions having both organic form and inorganic form, and the calcium ion concentration in the inorganic particles-containing additive compositions ($\alpha$), ($\beta$) is extremely low, and when added in milk or other foods, the problem experienced when soluble inorganic or organic calcium is added does not occur.

The calcium ion concentration in the present invention is measured and calculated in the following manner:

Measuring apparatus: Ion Meter IM-40S of Toa Dempa Kogyo

Preparation of samples: Inorganic particles-containing additive composition ($\alpha$) or ($\beta$) is prepared in 10% by weight, and centrifuged for 1 hour at 10,000 rpm, and the obtained supernatant is used as a sample.

Solvent: Distilled water.

The inorganic particles-containing additive composition ($\alpha$) or ($\beta$) of the present invention is extremely excellent in re-dispersion in water, and is easily dispersed in water without using a particular dispersing machine or agitating machine.

Therefore, by using the inorganic particles-containing additive composition ($\alpha$) or ($\beta$) of the present invention, when preparing food, for example, mineral-enriched milk, the inorganic particles-containing additive composition ($\alpha$) or ($\beta$) of the present invention are directly added to the milk and stirred firmly to disperse the inorganic particles-containing additive composition ($\alpha$) or ($\beta$) in the milk, or a water dispersion of minerals obtained by dispersing the inorganic particles-containing additive composition ($\alpha$) or ($\beta$) preliminarily in water may be added to the milk. In reduced milk, the inorganic particles-containing additive composition ($\alpha$) or ($\beta$) of the present invention may be added to butter or butter oil melted at a temperature of approximately 60° C., and stirred at high speed and dispersed, and reduced skimmed milk or skimmed milk may be added thereto and homogenized.

In the mineral-enriched milk prepared in these methods, the amount of minerals removed by a clarifier is substantially decreased as compared with the conventional method. That is, minerals are held very stably in the milk, yogurt or juice containing the inorganic particles-containing additive composition ($\alpha$) or ($\beta$) of the present invention. Moreover, since the inorganic particles-containing additive composition ($\alpha$) or ($\beta$) of the present invention is excellent in dispersion of minerals, the required stirring time is short when adding to milk, and aggregation of minerals does not occur as seen in the case of long-term stirring in butter. Further, if the inorganic particles-containing additive slurry composition ($\alpha$) or ($\beta$) of the present invention is added abundantly in milk or cream for coffee, there is no change in flavor or taste of products such as peculiar taste or smell noted in water soluble calcium compound or in gelation of products.

Aside from the above applications, the inorganic particles-containing additive composition ($\alpha$) or ($\beta$) of the present invention can be used in cream, soup, coffee, tea, oolong tea, soybean milk, sports drink, near-water, other liquid foods, wine, sake, other alcoholic drinks, cheese, gum, bread, candies, noodles, other foods and tablets for mineral-enriching purposes.

There is no problem even if the inorganic particles-containing additive composition ($\alpha$) or ($\beta$) of the present invention is used together with water soluble inorganic mineral salts such as calcium lactate, calcium chloride, magnesium sulfate, magnesium chloride, sodium iron citrate and ammonium ferric citrate.

The present invention will be described in more detail below by presenting examples and comparative examples, but it must be noted that the present invention is not limited to these examples.

EXAMPLE 1

A precursor was prepared by mixing and stirring 1142.9 g of water, 155.4 g of calcium hydroxide, and 192 g of citric acid (anhydrous) and 343 g of 40% phosphoric acid. To the precursor, 224 g of 50% potassium hydroxide was added, stirred sufficiently, and heated at 120° C. for 30 minutes by the use of an autoclave to thus obtain a mixed slurry.

Next, the mixed slurry was dehydrated by the use of a super centrifugal machine GLE (of CEPA Corp.), the obtained dehydrated cake was re-dispersed in water to thus prepare an inorganic particles-containing additive slurry composition ($\alpha$) having a solid concentration of 35% by weight. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 65,000 and the electric conductivity (mS/cm) when the composition was adjusted to a solid concentration of 10% by weight was 12.5.

The weight-average diameter in particle size distribution of the inorganic particles-containing additive slurry composition was 0.15 $\mu$m, and the calcium ion concentration in the inorganic particles-containing additive slurry composition was 0 mg/L.

The viscosity of the obtained inorganic particles-containing additive slurry composition was sufficiently low, and there was no problem at all in fluidity.

EXAMPLE 2

A precursor was prepared by mixing and stirring 1142.9 g of water, 155.4 g of calcium hydroxide, and 192 g of citric acid (anhydrous). To the precursor, 609.6 g of 40% dipotassium hydrogenphosphate was added and stirred, and 56 g of 50% potassium hydroxide was finally added, stirred sufficiently, and heated at 120° C. for 30 minutes by the use of an autoclave to thus obtain a mixed slurry.

Next, the mixed slurry was dehydrated by the use of a super centrifugal machine, the obtained dehydrated cake was re-dispersed in water to thus prepare an inorganic particles-containing additive slurry composition ($\alpha$) having a solid concentration of 35% by weight. The molar ratio of components was calcium hydroxide: citric acid: phosphoric acid ion: alkali metal of 2.1:1.0:1.4:3.3.

The amount X (mg/Kg) of the alkali metal contained in a solid content of the dried inorganic particles-containing additive slurry composition was 88,000 and the electric conductivity (mS/cm) when the composition was adjusted to a solid concentration of 10% by weight was 14.3.

The weight-average diameter in particle size distribution of the inorganic particles-containing additive slurry composition was 0.14 $\mu$m, and the calcium ion concentration in the inorganic particles-containing additive slurry composition was 0 mg/L.

The viscosity of the obtained inorganic particles-containing additive slurry composition was sufficiently low, and there was no problem at all in fluidity.

EXAMPLE 3

A precursor was prepared by mixing and stirring 1142.9 g of water, 155.4 g of calcium hydroxide, and 192 g of citric acid (anhydrous) and 224 g of 50% potassium hydroxide. To the precursor, 343 g of 40% phosphoric acid was added and stirred sufficiently, and heated at 120° C. for 30 minutes by the use of an autoclave to thus obtain a mixed slurry.

Next, the mixed slurry was dehydrated by the use of a super centrifugal machine, the obtained dehydrated cake was re-dispersed in water to thus prepare an inorganic particles-containing additive slurry composition ($\alpha$) having a solid concentration of 35% by weight. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 59,000 and the electric conductivity (mS/cm) when the composition was adjusted to a solid concentration of 10% by weight was 11.3.

The weight-average diameter in particle size distribution of the inorganic particles-containing additive slurry composition was 0.15 $\mu$m, and the calcium ion concentration in the inorganic particles-containing additive slurry composition was 0 mg/L.

The viscosity of the obtained inorganic particles-containing additive slurry composition was sufficiently low, and there was no problem at all in fluidity.

EXAMPLE 4

A precursor was prepared by mixing and stirring 1142.9 g of water, 155.4 g of calcium hydroxide, 224 g of 50% potassium hydroxide and 343 g of 40% phosphoric acid. To the precursor, 192 g of citric acid (anhydrous) was added and stirred sufficiently, and heated at 120° C. for 30 minutes by the use of an autoclave to thus obtain a mixed slurry.

Next, the mixed slurry was dehydrated by the use of a rotary filter, the obtained dehydrated cake was re-dispersed in water to thus prepare an inorganic particles-containing additive slurry composition ($\alpha$) having a solid concentration of 35% by weight. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 70,000 and the electric conductivity (mS/cm) when the composition was adjusted to a solid concentration of 10% by weight was 13.4.

The weight-average diameter in particle size distribution of the inorganic particles-containing additive slurry composition was 0.31 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity.

EXAMPLE 5

A precursor was prepared by mixing and stirring 1142.9 g of water, 155.4 g of calcium hydroxide, and 192 g of citric acid (anhydrous). To the precursor, 743 g of 40% tripotossium phosphate acid was added and stirred sufficiently to thus obtain a mixed slurry.

Next, the mixed slurry was dehydrated by the use of a rotary filter, the obtained dehydrated cake was re-dispersed in water to thus prepare an inorganic particles-containg additive slurry composition (α) having a solid concentration of 35% by weight. The molar ratio of components was calcium hydroxide: citric acid: phosphoric acid ion: alkali metal of 2.1:1.0:1.4:4.2.

The amount X (mg/Kg) of the alkali metal contained in a solid content of the dried inorganic particles-containing additive slurry composition was 35,000 and the electric conductivity (mS/cm) when the composition was adjusted to a solid concentration of 10% by weight was 6.0.

The weight-average diameter in particle size distribution of the inorganic particles-containing additive slurry composition was 0.39 μm, and the calcium ion concentration in the inorganic particles-containing additive slurry composition was 0.5 mg/L.

The viscosity of the obtained inorganic particles-containing additive slurry composition was sufficiently low, and there was no problem at all in fluidity.

EXAMPLE 6

A precursor was prepared by mixing and stirring 1142.9 g of water, 155.4 g of calcium hydroxide, and 192 g of citric acid (anhydrous) and 343 g of 40% phosphoric acid. To the precursor, 224 g of 50% potassium hydroxide was added, stirred sufficiently to thus obtain a mixed slurry.

Next, the mixed slurry was dehydrated by the use of a super centrifugal machine, the obtained dehydrated cake was re-dispersed in water and heated at 120° C. for 30 minutes by the use of an autoclave to thus prepare an inorganic particles-containing additive slurry composition (α) having a solid concentration of 35% by weight. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 53,000 and the electric conductivity (mS/cm) when the composition was adjusted to a solid concentration of 10% by weight was 9.5.

The weight-average diameter in particle size distribution of the inorganic particles-containing additive slurry composition was 0.30 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity.

EXAMPLE 7

A precursor was prepared by mixing and stirring 1142.9 g of water, 155.4 g of calcium hydroxide, and 192 g of citric acid (anhydrous) and 343 g of 40% phosphoric acid. To the precursor, 224 g of 50% potassium hydroxide was added, stirred sufficiently, and heated at 120° C. for 30 minutes by the use of an autoclave to thus obtain a mixed slurry.

Next, the mixed slurry was dehydrated by the use of a super centrifugal machine, the obtained dehydrated cake was re-dispersed in water to thus prepare an inorganic particles-containing additive slurry composition (α) having a solid concentration of 35% by weight. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 22,000 and the electric conductivity (mS/cm) when the composition was adjusted to a solid concentration of 10% by weight was 3.5.

The weight-average diameter in particle size distribution of the inorganic particles-containing additive slurry composition was 0.12 μm, and the calcium ion concentration in the inorganic particles-containing additive slurry composition was 0.5 mg/L.

The viscosity of the obtained inorganic particles-containing additive slurry composition was sufficiently low, and there was no problem at all in fluidity.

EXAMPLE 8

An inorganic particles-containing additive slurry composition (α) having a solid concentration of 35% by weight was prepared in the same manner as in Example 7 except that the dehydration by the use of a super centrifugal machine and re-dispersion were repeated three times. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 8,300 and the electric conductivity (mS/cm) when the composition was adjusted to a solid concentration of 10% by weight was 1.2.

The weight-average diameter in particle size distribution of the inorganic particles-containing additive slurry composition was 0.13 μm, and the calcium ion concentration in the inorganic particles-containing additive slurry composition was 0.7 mg/L.

The viscosity of the obtained inorganic particles-containing additive slurry composition was sufficiently low, and there was no problem at all in fluidity.

EXAMPLE 9

An inorganic particles-containing additive slurry composition (α) having a solid concentration of 35% by weight was prepared in the same manner as in Example 7 except that the molar ratio of components was changed as follows. That is, the molar ratio of components was calcium hydroxide: citric acid: phosphoric acid ion: alkali metal of 3.3:1.0:2.7:4.2.

The amount X (mg/Kg) of the alkali metal contained in a solid content of the dried inorganic particles-containing additive slurry composition was 82,000 and the electric conductivity (mS/cm) when the composition was adjusted to a solid concentration of 10% by weight was 13.2.

The weight-average diameter in particle size distribution of the inorganic particles-containing additive slurry composition was 0.30 μm, and the calcium ion concentration in the inorganic particles-containing additive slurry composition was 0.7 mg/L.

The viscosity of the obtained inorganic particles-containing additive slurry composition was sufficiently low, and there was no problem at all in fluidity.

EXAMPLE 10

An inorganic particles-containing additive slurry composition (α) having a solid concentration of 35% by weight was prepared in the same manner as in Example 7 except that calcium oxide was used instead of calcium hydroxide. The molar ratio of components was calcium oxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 36,000 and the electric conductivity (mS/cm) when the composition was adjusted to a solid concentration of 10% by weight was 6.6.

The weight-average diameter in particle size distribution of the inorganic particles-containing additive slurry composition was 0.47 μm, and the calcium ion concentration in the inorganic particles-containing additive slurry composition was 1.0 mg/L.

The viscosity of the obtained inorganic particles-containing additive slurry composition was sufficiently low, and there was no problem at all in fluidity.

EXAMPLE 11

An inorganic particles-containing additive slurry composition (α) having a solid concentration of 35% by weight was prepared in the same manner as in Example 8 except that calcium carbonate was used instead of calcium hydroxide. The molar ratio of components was calcium carbonate: citric acid: phosphoric acid ion: alkali metal of 2.1:1.0:1.4:2.0.

The amount X (mg/Kg) of the alkali metal contained in a solid content of the dried inorganic particles-containing additive slurry composition was 9,400 and the electric conductivity (mS/cm) when the composition was adjusted to a solid concentration of 10% by weight was 1.6.

The weight-average diameter in particle size distribution of the inorganic particles-containing additive slurry composition was 0.13 μm, and the calcium ion concentration in the inorganic particles-containing additive slurry composition was 0.8 mg/L.

The viscosity of the obtained inorganic particles-containing additive slurry composition was sufficiently low, and there was no problem at all in fluidity.

EXAMPLE 12

An inorganic particles-containing additive slurry composition (α) having a solid concentration of 35% by weight was prepared in the same manner as in Example 7 except that 81.4 g of calcium hydroxide and 58.3 g of magnesium hydroxide were used instead of 155.4 g of calcium hydroxide. The molar ratio of components was calcium hydroxide: magnesium hydroxide: citric acid: phosphoric acid ion: alkali metal of 1.1:1.0:1.0:1.4:2.0.

The amount X (mg/Kg) of the alkali metal contained in a solid content of the dried inorganic particles-containing additive slurry composition was 31,000 and the electric conductivity (mS/cm) when the composition was adjusted to a solid concentration of 10% by weight was 5.6.

The weight-average diameter in particle size distribution of the inorganic particles-containing additive slurry composition was 0.28 μm, and the calcium ion concentration in the inorganic particles-containing additive slurry composition was 0.5 mg/L.

The viscosity of the obtained inorganic particles-containing additive slurry composition was sufficiently low, and there was no problem at all in fluidity.

EXAMPLE 13

An inorganic particles-containing additive slurry composition (α) having a solid concentration of 35% by weight was prepared in the same manner as in Example 7 except that 151.7 g of calcium hydroxide and 4.5 g of ferrous hydroxide were used instead of 155.4 g calcium hydroxide. The molar ratio of components was calcium hydroxide: ferrous hydroxide: citric acid: phosphoric acid ion: alkali metal of 2.05:0.05:1.0:1.4:2.0.

The amount X (mg/Kg) of the alkali metal contained in a solid content of the dried inorganic particles-containing additive slurry composition was 37,000 and the electric conductivity (mS/cm) when the composition was adjusted to a solid concentration of 10% by weight was 6.8.

The weight-average diameter in particle size distribution of the inorganic particles-containing additive slurry composition was 0.26 μm, and the calcium ion concentration in the inorganic particles-containing additive slurry composition was 0.9 mg/L.

The viscosity of the obtained inorganic particles-containing additive slurry composition was sufficiently low, and there was no problem at all in fluidity.

EXAMPLE 14

An inorganic particles-containing additive slurry composition (α) having a solid concentration of 35% by weight was prepared in the same manner as in Example 7 except that 112 g of 50% potassium hydroxide and 80 g of 50% sodium hydroxide were used instead of 224 g of 50% potassium hydroxide. The molar ratio of components was calcium hydroxide: citric acid: phosphoric acid: potassium hydroxide: sodium hydroxide of 2.1:1.0:1.4:1.0:1.0.

The amount X (mg/Kg) of the alkali metal contained in a solid content of the dried inorganic particles-containing additive slurry composition was 16,000 and the electric conductivity (mS/cm) when the composition was adjusted to a solid concentration of 10% by weight was 2.7.

The weight-average diameter in particle size distribution of the inorganic particles-containing additive slurry composition was 0.17 μm, and the calcium ion concentration in the inorganic particles-containing additive slurry composition was 0.5 mg/L.

The viscosity of the obtained inorganic particles-containing additive slurry composition was sufficiently low, and there was no problem at all in fluidity.

EXAMPLE 15

An inorganic particles-containing additive powder composition (β) was prepared by drying the inorganic particles-containing additive slurry composition (α) obtained in Example 7 by using a spray dryer. To 100 parts by weight of the inorganic particles-containing additive powder composition, 20 parts by weight of polyglycerin fatty acid ester and water were added, and stirred and mixed, and a mixed slurry of an inorganic particles-containing additive composition (β) having a solid concentration of 35% by weight was prepared.

The amount X (mg/Kg) of the alkali metal contained in a solid content of the dried inorganic particles-containing additive slurry composition was 18,000 and the electric conductivity (mS/cm) when the composition was adjusted to a solid concentration of 10% by weight was 2.9.

The weight-average diameter in particle size distribution of the inorganic particles-containing additive slurry composition was 0.10 μm, and the calcium ion concentration in the inorganic particles-containing additive slurry composition was 0.4 mg/L.

The viscosity of the obtained inorganic particles-containing additive slurry composition was sufficiently low, and there was no problem at all in fluidity. Meanwhile, the polyglycerin fatty acid ester was previously dissolved in warm water of 70° C. and then added.

EXAMPLE 16

An inorganic particles-containing additive powder composition (β) was prepared by drying the inorganic particles-containing additive slurry composition (α) obtained in Example 7 by using a spray dryer. To 100 parts by weight of the inorganic particles-containing additive powder composition, 8 parts by weight of gum arabic and water were added, and stirred and mixed, and a mixed slurry of an inorganic particles-containing additive composition (β) having a solid concentration of 35% by weight was prepared.

The amount X (mg/Kg) of the alkali metal contained in a solid content of the dried inorganic particles-containing additive slurry composition was 21,000 and the electric conductivity (mS/cm) when the composition was adjusted to a solid concentration of 10% by weight was 3.4.

The weight-average diameter in particle size distribution of the inorganic particles-containing additive slurry composition was 0.08 μm, and the calcium ion concentration in the inorganic particles-containing additive slurry composition was 0.3 mg/L.

The viscosity of the obtained inorganic particles-containing additive slurry composition was sufficiently low, and there was no problem at all in fluidity. Meanwhile, the gum arabic was previously dissolved in water and then added.

EXAMPLE 17

An inorganic particles-containing additive powder composition (β) was prepared having a solid concentration of 21% by weight by adding 12 parts by weight of propylene glycol ester arginate to 100 parts by weight of the inorganic particles-containing additive slurry composition (α) obtained in Example 7, and stirring and mixing.

The amount X (mg/Kg) of the alkali metal contained in a solid content of the dried inorganic particles-containing additive slurry composition was 20,000 and the electric conductivity (mS/cm) when the composition was adjusted to a solid concentration of 10% by weight was 3.2.

The weight-average diameter in particle size distribution of the inorganic particles-containing additive slurry composition was 0.11 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity. Meanwhile, the polypropylene glycol ester arginate was previously dissolved in warm water of 70° C. and then added.

EXAMPLE 18

An inorganic particles-containing additive powder composition (β) was prepared by drying the inorganic particles-containing additive slurry composition (α) obtained in Example 1 by using a spray dryer. To 100 parts by weight of the inorganic particles-containing additive powder composition, 15 parts by weight of sucrose fatty acid ester and water were added, and stirred and mixed, and a mixed slurry of an inorganic particles-containing additive composition (β) having a solid concentration of 35% by weight was prepared.

The amount X (mg/Kg) of the alkali metal contained in a solid content of the dried inorganic particles-containing additive slurry composition was 62,000 and the electric conductivity (mS/cm) when the composition was adjusted to a solid concentration of 10% by weight was 11.6.

The weight-average diameter in particle size distribution of the inorganic particles-containing additive slurry composition was 0.10 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity. Meanwhile, the sucrose fatty acid ester was previously dissolved in warm water of 70° C. and then added.

EXAMPLE 19

An inorganic particles-containing additive powder composition (β) was prepared by drying the inorganic particles-containing additive slurry composition (α) obtained in Example 7 by using a spray dryer. To 100 parts by weight of the inorganic particles-containing additive powder composition, 10 parts by weight of propylene glycol ester arginate and water were added, and stirred and mixed to obtain a mixed slurry of 30% by weight, then the mixed slurry was dispersed under a pressure of 150 Kg/cm$^2$ by the use of a high pressure homogenizer (of A. P. GAULIN Corp.) to thus obtain an inorganic particles-containing additive slurry composition (β).

The amount X (mg/Kg) of the alkali metal contained in a solid content of the dried inorganic particles-containing additive slurry composition was 20,000 and the electric conductivity (mS/cm) when the composition was adjusted to a solid concentration of 10% by weight was 3.2.

The weight-average diameter in particle size distribution of the inorganic particles-containing additive slurry composition was 0.04 μm, and the calcium ion concentration in the inorganic particles-containing additive slurry composition was 0.3 mg/L.

The viscosity of the obtained inorganic particles-containing additive slurry composition was sufficiently low, and there was no problem at all in fluidity. Meanwhile, the propylene glycol ester arginate was previously dissolved in warm water of 70° C. and then added.

EXAMPLE 20

An inorganic particles-containing additive powder composition (β) was prepared by drying the inorganic particles-containing additive slurry composition (α) obtained in Example 7 by using a spray dryer. To 100 parts by weight of the inorganic particles-containing additive powder composition, 20 parts by weight of polyglycerin fatty acid ester and water were added, and stirred and mixed to obtain a mixed slurry of 35% by weight, then the mixed slurry was wet-ground by the use of a wet-grinding machine Dyno mill KD pilot type (of WAB Corp.) to thus obtain an inorganic particles-containing additive slurry composition (β).

The amount X (mg/Kg) of the alkali metal contained in a solid content of the dried inorganic particles-containing additive slurry composition was 18,000 and the electric conductivity (mS/cm) when the composition was adjusted to a solid concentration of 10% by weight was 2.9.

The weight-average diameter in particle size distribution of the inorganic particles-containing additive slurry composition was 0.60 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity. Meanwhile, the polyglycerin fatty acid ester was previously dissolved in warm water of 70° C. and then added.

COMPARATIVE EXAMPLE 1

An inorganic particles-containing additive slurry composition having a solid concentration of 23% by weight was prepared in the same manner as in Example 1 except that the dehydration by the use of a super centrifugal machine and the subsequent steps were not carried out. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 108,000 and the electric conductivity (mS/cm) when the composition was adjusted to a solid concentration of 10% by weight was 17.5.

The weight-average diameter in particle size distribution of the inorganic particles-containing additive slurry composition was 0.18 μm, and the calcium ion concentration in the inorganic particles-containing additive slurry composition was 0.1 mg/L.

The viscosity of the obtained inorganic particles-containing additive slurry composition was sufficiently low, and there was no problem at all in fluidity.

COMPARATIVE EXAMPLE 2

An inorganic particles-containing additive slurry composition having a solid concentration of 23% by weight was prepared in the same manner as in Example 2 except that the dehydration by the use of a super centrifugal machine and the subsequent steps were not carried out. The molar ratio of components was calcium hydroxide: citric acid: phosphoric acid ion: alkali metal of 2.1:1.0:1.4:3.3.

The amount X (mg/Kg) of the alkali metal contained in a solid content of the dried inorganic particles-containing additive slurry composition was 248,000 and the electric conductivity (mS/cm) when the composition was adjusted to a solid concentration of 10% by weight was 40.2.

The weight-average diameter in particle size distribution of the inorganic particles-containing additive slurry composition was 0.14 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity.

COMPARATIVE EXAMPLE 3

An inorganic particles-containing additive slurry composition having a solid concentration of 22% by weight was prepared in the same manner as in Example 5 except that the dehydration by the use of a super centrifugal machine and the subsequent steps were not carried out.

The amount X (mg/Kg) of the alkali metal contained in a solid content of the dried inorganic particles-containing additive slurry composition was 275,000 and the electric conductivity (mS/cm) when the composition was adjusted to a solid concentration of 10% by weight was 45.0.

The weight-average diameter in particle size distribution of the inorganic particles-containing additive slurry composition was 0.15 μm, and the calcium ion concentration in the inorganic particles-containing additive slurry composition was 0.6 mg/L.

The viscosity of the obtained inorganic particles-containing additive slurry composition was sufficiently low, and there was no problem at all in fluidity.

COMPARATIVE EXAMPLE 4

An inorganic particles-containing additive slurry composition having a solid concentration of 23% by weight was prepared in the same manner as in Example 10 except that the dehydration by the use of a super centrifugal machine and the subsequent steps were not carried out. The molar ratio of components was calcium oxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 158,000 and the electric conductivity (mS/cm) when the composition was adjusted to a solid concentration of 10% by weight was 24.7.

The weight-average diameter in particle size distribution of the inorganic particles-containing additive slurry composition was 0.51 μm, and the calcium ion concentration in the inorganic particles-containing additive slurry composition was 0.8 mg/L.

The viscosity of the obtained inorganic particles-containing additive slurry composition was sufficiently low, and there was no problem at all in fluidity.

COMPARATIVE EXAMPLE 5

An inorganic particles-containing additive slurry composition having a solid concentration of 23% by weight was prepared in the same manner as in Example 11 except that the dehydration by the use of a super centrifugal machine and the subsequent steps were not carried out. The molar ratio of components was calcium carbonate: citric acid: phosphoric acid ion: alkali metal of 2.1:1.0:1.4:2.0.

The amount X (mg/Kg) of the alkali metal contained in a solid content of the dried inorganic particles-containing additive slurry composition was 98,000 and the electric conductivity (mS/cm) when the composition was adjusted to a solid concentration of 10% by weight was 16.3.

The weight-average diameter in particle size distribution of the inorganic particles-containing additive slurry composition was 0.16 μm, and the calcium ion concentration in the inorganic particles-containing additive slurry composition was 0.3 mg/L.

The viscosity of the obtained inorganic particles-containing additive slurry composition was sufficiently low, and there was no problem at all in fluidity.

COMPARATIVE EXAMPLE 6

An inorganic particles-containing additive slurry composition having a solid concentration of 23% by weight was prepared in the same manner as in Example 12 except that the dehydration by the use of a super centrifugal machine and the subsequent steps were not carried out. The molar ratio of components was calcium hydroxide: magnesium hydroxide: citric acid: phosphoric acid ion: alkali metal of 1.1:1.0:1.0:1.4:2.0.

The amount X (mg/Kg) of the alkali metal contained in a solid content of the dried inorganic particles-containing additive slurry composition was 111,000 and the electric conductivity (mS/cm) when the composition was adjusted to a solid concentration of 10% by weight was 17.9.

The weight-average diameter in particle size distribution of the inorganic particles-containing additive slurry composition was 0.31 μm, and the calcium ion concentration in the inorganic particles-containing additive slurry composition was 0.5 mg/L.

The viscosity of the obtained inorganic particles-containing additive slurry composition was sufficiently low, and there was no problem at all in fluidity.

COMPARATIVE EXAMPLE 7

An inorganic particles-containing additive slurry composition having a solid concentration of 23% by weight was prepared in the same manner as in Example 13 except that the dehydration by the use of a super centrifugal machine and the subsequent steps were not carried out. The molar ratio of components was calcium hydroxide: ferrous hydroxide: citric acid: phosphoric acid: potassium hydroxide of 2.05:0.05:1.0:1.4:2.0.

The amount X (mg/Kg) of the alkali metal contained in a solid content of the dried inorganic particles-containing additive slurry composition was 173,000 and the electric conductivity (mS/cm) when the composition was adjusted to a solid concentration of 10% by weight was 26.4.

The weight-average diameter in particle size distribution of the inorganic particles-containing additive slurry composition was 0.29 μm, and the calcium ion concentration in the inorganic particles-containing additive slurry composition was 0.3 mg/L.

The viscosity of the obtained inorganic particles-containing additive slurry composition was sufficiently low, and there was no problem at all in fluidity.

COMPARATIVE EXAMPLE 8

An inorganic particles-containing additive slurry composition having a solid concentration of 22% by weight was prepared in the same manner as in Example 14 except that the dehydration by the use of a super centrifugal machine and the subsequent steps were not carried out. The molar ratio of components was calcium hydroxide: citric acid: phosphoric acid: potassium hydroxide: sodium hydroxide of 2.1:1.0:1.4:1.0:1.0.

The amount X (mg/Kg) of the alkali metal contained in a solid content of the dried inorganic particles-containing additive slurry composition was 107,000 and the electric conductivity (mS/cm) when the composition was adjusted to a solid concentration of 10% by weight was 16.7.

The weight-average diameter in particle size distribution of the inorganic particles-containing additive slurry composition was 0.23 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity.

COMPARATIVE EXAMPLE 9

An inorganic particles-containing additive slurry composition having a solid concentration of 15% by weight was prepared in the same manner as in Example 1 except that the dehydration by the use of a super centrifugal machine and the re-dispersion were repeated 10 times. The molar ratio of components was calcium hydroxide: citric acid: phosphoric acid ion: alkali metal of 2.1:1.0:1.4:2.0.

The amount X (mg/Kg) of the alkali metal contained in a solid content of the dried inorganic particles-containing additive slurry composition was 60 and the electric conductivity (mS/cm) when the composition was adjusted to a solid concentration of 10% by weight was 0.15.

The weight-average diameter in particle size distribution of the inorganic particles-containing additive slurry composition was 1.24 μm, and the calcium ion concentration in the inorganic particles-containing additive slurry composition was 2.7 mg/L.

The viscosity of the obtained inorganic particles-containing additive slurry composition was viscous and workability was inferior.

COMPARATIVE EXAMPLE 10

An inorganic particles-containing additive slurry composition having a solid concentration of 15% by weight was prepared in the same manner as in Example 5 except that the dehydration by the use of a super centrifugal machine and the re-dispersion were repeated 12 times. The molar ratio of components was calcium hydroxide: citric acid: phosphoric acid ion: alkali metal of 2.1:1.0:1.4:4.2.

The amount X (mg/Kg) of the alkali metal contained in a solid content of the dried inorganic particles-containing additive slurry composition was 90 and the electric conductivity (mS/cm) when the composition was adjusted to a solid concentration of 10% by weight was 0.08.

The weight-average diameter in particle size distribution of the inorganic particles-containing additive slurry composition was 1.09 μm, and the calcium ion concentration in the inorganic particles-containing additive slurry composition was 2.1 mg/L.

The viscosity of the obtained inorganic particles-containing additive slurry composition was viscous and the workability was inferior.

COMPARATIVE EXAMPLE 11

An inorganic particles-containing additive powder composition was prepared by drying the inorganic particles-containing additive slurry composition obtained in Comparative Example 1 by using a spray dryer. To 100 parts by weight of the inorganic particles-containing additive powder composition, 20 parts by weight of polyglycerin fatty acid ester and water were added, and stirred and mixed, and an inorganic particles-containing additive slurry composition having a solid concentration of 35% by weight was prepared.

The amount X (mg/Kg) of the alkali metal contained in a solid content of the dried inorganic particles-containing additive slurry composition was 95,000 and the electric conductivity (mS/cm) when the composition was adjusted to a solid concentration of 10% by weight was 15.6.

The weight-average diameter in particle size distribution of the inorganic particles-containing additive slurry composition was 0.15 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity. Meanwhile, the polyglycerin fatty acid ester was previously dissolved in warm water of 70° C. and then added.

COMPARATIVE EXAMPLE 12

An inorganic particles-containing additive slurry composition having a solid concentration of 35% by weight was prepared was prepared in the same manner as in Comparative Example 11 except that to 100 parts by weight of the inorganic particles-containing additive powder composition, 8 parts by weight of gum arabic was added.

The amount X (mg/Kg) of the alkali metal contained in a solid content of the dried inorganic particles-containing additive slurry composition was 103,000 and the electric conductivity (mS/cm) when the composition was adjusted to a solid concentration of 10% by weight was 16.9.

The weight-average diameter in particle size distribution of the inorganic particles-containing additive slurry composition was 0.11 μm, and the calcium ion concentration in the inorganic particles-containing additive slurry composition was 0.2 mg/L.

The viscosity of the obtained inorganic particles-containing additive slurry composition was sufficiently low, and there was no problem at all in fluidity. Meanwhile, the gum arabic was previously dissolved in water and then added.

COMPARATIVE EXAMPLE 13

An inorganic particles-containing additive powder composition was prepared by drying the inorganic particles-containing additive slurry composition obtained in Comparative Example 1 by using a spray dryer. To 100 parts by weight of the inorganic particles-containing additive powder composition, 10 parts by weight of propylene glycol ester arginate and water were added, and stirred and mixed to obtain a mixed slurry of 30% by weight, then the mixed slurry was dispersed under a pressure of 150 Kg/cm$^2$ by the use of a high pressure homogenizer to thus obtain an inorganic particles-containing additive slurry composition.

The amount X (mg/Kg) of the alkali metal contained in a solid content of the dried inorganic particles-containing additive slurry composition was 105,000 and the electric conductivity (mS/cm) when the composition was adjusted to a solid concentration of 10% by weight was 17.2.

The weight-average diameter in particle size distribution of the inorganic particles-containing additive slurry composition was 0.05 μm, and the calcium ion concentration in the inorganic particles-containing additive slurry composition was 0.3 mg/L.

The viscosity of the obtained inorganic particles-containing additive slurry composition was sufficiently low, and there was no problem at all in fluidity. Meanwhile, the propylene glycol ester arginate was previously dissolved in warm water of 70° C. and then added.

TABLE 1

| | Multivalent metal compound A | Organic acid B | Phosphoric acid source C | Alkali metal compound D | A/B Molar ratio | C/B Molar ratio | D/B Molar ratio | Emulsification stabilizer | Amount of alkali metal X (mg/kg) | Electric conductivity Y (mS/cm) | Weight-average diameter K (μm) | Production method |
|---|---|---|---|---|---|---|---|---|---|---|---|---|
| Ex. 1 | Ca(OH)$_2$ | Citric acid | Phosphoric acid | KOH | 2.1:1 | 1.4:1 | 2.0:1 | — | 65,000 | 12.5 | 0.15 | IV |
| Ex. 2 | Ca(OH)$_2$ | Citric acid | Dipotassium hydrogenphosphate | KOH | 2.1:1 | 1.4:1 | 3.3:1 | — | 88,000 | 14.3 | 0.14 | III |
| Ex. 3 | Ca(OH)$_2$ | Citric acid | Phosphoric acid | KOH | 2.1:1 | 1.4:1 | 2.0:1 | — | 59,000 | 11.3 | 0.15 | I |
| Ex. 4 | Ca(OH)$_2$ | Citric acid | Phosphoric acid | KOH | 2.1:1 | 1.4:1 | 2.0:1 | — | 70,000 | 13.4 | 0.31 | II |
| Ex. 5 | Ca(OH)$_2$ | Citric acid | Tripotassium phosphate | — | 2.1:1 | 1.4:1 | 4.2:1 | — | 35,000 | 6.0 | 0.39 | III |
| Ex. 6 | Ca(OH)$_2$ | Citric acid | Phosphoric acid | KOH | 2.1:1 | 1.4:1 | 2.0:1 | — | 53,000 | 9.5 | 0.3 | IV |
| Ex. 7 | Ca(OH)$_2$ | Citric acid | Phosphoric acid | KOH | 2.1:1 | 1.4:1 | 2.0:1 | — | 22,000 | 3.5 | 0.12 | IV |
| Ex. 8 | Ca(OH)$_2$ | Citric acid | Phosphoric acid | KOH | 2.1:1 | 1.4:1 | 2.0:1 | — | 8,300 | 1.2 | 0.13 | IV |
| Ex. 9 | Ca(OH)$_2$ | Citric acid | Phosphoric acid | KOH | 3.3:1 | 2.7:1 | 4.2:1 | — | 82,000 | 13.2 | 0.3 | IV |
| Ex. 10 | CaO | Citric acid | Phosphoric acid | KOH | 2.1:1 | 1.4:1 | 2.0:1 | — | 36,000 | 6.6 | 0.47 | IV |
| Ex. 11 | CaCO$_3$ | Citric acid | Phosphoric acid | KOH | 2.1:1 | 1.4:1 | 2.0:1 | — | 9,400 | 1.6 | 0.13 | IV |
| Ex. 12 | Ca(OH)$_2$ Mg(OH)$_2$ | Citric acid | Phosphoric acid | KOH | 2.1:1 | 1.4:1 | 2.0:1 | — | 31000 | 5.6 | 0.28 | IV |
| Ex. 13 | Ca(OH)$_2$ Fe(OH)$_2$ | Citric acid | Phosphoric acid | KOH | 2.1:1 | 1.4:1 | 2.0:1 | — | 37000 | 6.8 | 0.26 | IV |
| Ex. 14 | Ca(OH)$_2$ | Citric acid | Phosphoric acid | KOH NaOH | 2.1:1 | 1.4:1 | 2.0:1 | — | 16000 | 2.7 | 0.17 | IV |
| Ex. 15 | Ca(OH)$_2$ | Citric acid | Phosphoric acid | KOH | 2.1:1 | 1.4:1 | 2.0:1 | PG | 18,000 | 2.9 | 0.1 | IV |
| Ex. 16 | Ca(OH)$_2$ | Citric acid | Phosphoric acid | KOH | 2.1:1 | 1.4:1 | 2.0:1 | AG | 21,000 | 3.4 | 0.08 | IV |
| Ex. 17 | Ca(OH)$_2$ | Citric acid | Phosphoric acid | KOH | 2.1:1 | 1.4:1 | 2.0:1 | PGA | 20,000 | 3.2 | 0.11 | IV |
| Ex. 18 | Ca(OH)$_2$ | Citric acid | Phosphoric acid | KOH | 2.1:1 | 1.4:1 | 2.0:1 | SE | 62,000 | 11.6 | 0.1 | IV |
| Ex. 19 | Ca(OH)$_2$ | Citric acid | Phosphoric acid | KOH | 2.1:1 | 1.4:1 | 2.0:1 | PGA | 20,000 | 3.2 | 0.04 | IV |
| Ex. 20 | Ca(OH)$_2$ | Citric acid | Phosphoric acid | KOH | 2.1:1 | 1.4:1 | 2.0:1 | PG | 18,000 | 2.9 | 0.06 | IV |

PG: Abbreviation of polyglyceride fatty acid ester
AG: Abbreviation of gum arabic
PGA: Abbreviation of propylene glycol ester alginate
SE: Abbreviation of sucrose fatty acid ester

TABLE 2

| | Multivalent metal compound A | Organic acid B | Phosphoric acid source C | Alkali metal compound D | A/B Molar ratio | C/B Molar ratio | D/B Molar ratio | Emulsification stabilizer | Amount of alkali metal X (mg/kg) | Electric conductivity Y (mS/cm) | Weight-average diameter K (μm) | Production method |
|---|---|---|---|---|---|---|---|---|---|---|---|---|
| Comp. Ex. 1 | Ca(OH)$_2$ | Citric acid | Phosphoric acid | KOH | 2.1:1 | 1.4:1 | 2.0:1 | — | 108,000 | 17.5 | 0.18 | IV |
| Comp. Ex. 2 | Ca(OH)$_2$ | Citric acid | Dipotassium hydrogenphosphate | KOH | 2.1:1 | 1.4:1 | 3.3:1 | — | 248,000 | 40.2 | 0.14 | III |
| Comp. Ex. 3 | Ca(OH)$_2$ | Citric acid | Tripotassium phosphate | — | 2.1:1 | 1.4:1 | 4.2:1 | — | 275,000 | 45 | 0.15 | III |
| Comp. Ex. 4 | CaO | Citric acid | Phosphoric acid | KOH | 2.1:1 | 1.4:1 | 2.0:1 | — | 158,000 | 24.7 | 0.51 | IV |
| Comp. Ex. 5 | CaCO3 | Citric acid | Phosphoric acid | KOH | 2.1:1 | 1.4:1 | 2.0:1 | — | 98,000 | 16.3 | 0.16 | IV |
| Comp. Ex. 6 | Ca(OH)$_2$ Mg(OH)$_2$ | Citric acid | Phosphoric acid | KOH | 2.1:1 | 1.4:1 | 2.0:1 | — | 111000 | 17.9 | 0.31 | IV |
| Comp. Ex. 7 | Ca(OH)$_2$ Fe(OH)$_2$ | Citric acid | Phosphoric acid | KOH | 2.1:1 | 1.4:1 | 2.0:1 | — | 173000 | 26.4 | 0.29 | IV |
| Comp. Ex. 8 | Ca(OH)$_2$ | Citric acid | Phosphoric acid | KOH NaOH | 2.1:1 | 1.4:1 | 2.0:1 | — | 107000 | 16.7 | 0.23 | IV |
| Comp. Ex. 9 | Ca(OH)$_2$ | Citric acid | Phosphoric acid | KOH | 2.1:1 | 1.4:1 | 2.0:1 | — | 60 | 0.15 | 1.24 | IV |
| Comp. Ex. 10 | Ca(OH)$_2$ | Citric acid | Tripotassium phosphate | — | 2.1:1 | 1.4:1 | 4.2:1 | — | 90 | 0.08 | 1.09 | III |
| Comp. Ex. 11 | Ca(OH)$_2$ | Citric acid | Phosphoric acid | KOH | 2.1:1 | 1.4:1 | 2.0:1 | PG | 95,000 | 15.6 | 0.15 | IV |
| Comp. Ex. 12 | Ca(OH)$_2$ | Citric acid | Phosphoric acid | KOH | 2.1:1 | 1.4:1 | 2.0:1 | AG | 103,000 | 16.9 | 0.11 | IV |
| Comp. Ex. 13 | Ca(OH)$_2$ | Citric acid | Phosphoric acid | KOH | 2.1:1 | 1.4:1 | 2.0:1 | PGA | 105,000 | 17.2 | 0.05 | IV |

PG: Abbreviation of polyglyceride fatty acid ester
AG: Abbreviation of gum arabic
PGA: Abbreviation of propylene glycol ester alginate

EXAMPLES 21 TO 40, COMPARATIVE EXAMPLES 14 TO 26

The inorganic particles-containing additive slurry compositions obtained by Examples 1 to 20 and Comparative Examples 1 to 13 were dried by the use of a spray dryer to thus obtain inorganic particles-containing additive powder compositions.

Next, to the inorganic particles-containing additive powder compositions obtained by Examples 21–40, water was added so that the solid concentrations were 35% by weight, and the mixtures were shaken for 10 minutes by the use of a shaker to thus prepare re-dispersed suspensions. The viscosities of the re-dispersed suspensions of the inorganic particles-containing additive powder compositions were nearly the same as those of the inorganic particles-containing additive slurry compositions before drying and fluidities were quite satisfactory.

The amount X (mg/Kg) of the alkali metal contained in a solid content of the dried re-dispersed suspensions and the electric conductivity (mS/cm) when adjusted to a solid concentration of 10% by weight are shown in Table 3.

TABLE 3

| | X | Y |
|---|---|---|
| Ex. 21 | 65,000 | 12.4 |
| Ex. 22 | 88,000 | 14.3 |
| Ex. 23 | 59,000 | 11.5 |
| Ex. 24 | 71,000 | 13.7 |
| Ex. 25 | 34,000 | 6.2 |
| Ex. 26 | 54,000 | 9.7 |
| Ex. 27 | 22,000 | 3.4 |
| Ex. 28 | 8,300 | 1.2 |
| Ex. 29 | 84,000 | 13.3 |
| Ex. 30 | 36,000 | 6.5 |
| Ex. 31 | 9,300 | 1.4 |
| Ex. 32 | 32,000 | 5.7 |
| Ex. 33 | 37,000 | 6.7 |
| Ex. 34 | 15,000 | 2.5 |
| Ex. 35 | 18,000 | 2.9 |
| Ex. 36 | 21,000 | 3.4 |
| Ex. 37 | 20,000 | 3.2 |
| Ex. 38 | 62,000 | 11.4 |
| Ex. 39 | 20,000 | 3.1 |
| Ex. 40 | 18,000 | 3 |

X: Amount of alkali metal (mg/kg)
Y: Electric conductivity (ms/cm)

Next, to the inorganic particles-containing additive powder compositions obtained by Comparative Examples 14–26, water was added so that the solid content concentrations were almost identical to those of the slurry compositions before being powdered, and the mixtures were shaken for 10 minutes by the use of a shaker to thus prepare re-dispersed suspensions. The viscosities of the re-dispersed suspensions of the food additive powder compositions were nearly the same as those of the additive slurry compositions before drying and fluidities were quite satisfactory.

The amount X (mg/Kg) of the alkali metal contained in a solid content of the dried re-dispersed suspensions and the electric conductivity (mS/cm) when adjusted to a solid concentration of 10% by weight are shown in Table 4.

TABLE 4

|  | X | Y |
| --- | --- | --- |
| Comp. Ex. 14 | 107,000 | 17.7 |
| Comp. Ex. 15 | 249,000 | 40.8 |
| Comp. Ex. 16 | 276,000 | 45.1 |
| Comp. Ex. 17 | 157,000 | 24.6 |
| Comp. Ex. 18 | 97,000 | 16.1 |
| Comp. Ex. 19 | 110,000 | 17.2 |
| Comp. Ex. 20 | 172,000 | 26.1 |
| Comp. Ex. 21 | 107,000 | 16.4 |
| Comp. Ex. 22 | 60 | 0.14 |
| Comp. Ex. 23 | 90 | 0.08 |
| Comp. Ex. 24 | 94,000 | 15.3 |
| Comp. Ex. 25 | 103,000 | 16.6 |
| Comp. Ex. 26 | 105,000 | 17.0 |

X: Amount of alkali metal (mg/kg)
Y: Electric conductivity (ms/cm)

EXAMPLE 41

The inorganic particles-containing additive slurry composition prepared by Example 1 was weighed to be 32 g in terms of calcium and dispersed in 200 g of butter dissolved at 60° C. This dispersion was added with stirring into 9.55 Kg of skimmed milk and the mixture was sterilized to thus obtain a calcium-enriched milk. The calcium-enriched milk was taken into several measuring cylinders of 100 ml and they were stored at 5° C. The milk was taken out quetly periodically and a change with time in the amount of the precipitate at the bottom of the measuring cylinder was visually inspected. The results are shown by the following 5-rank evaluation in Table 5. Moreover, the calcium-enriched milk was subjected to a sensory test by 10 men and women by 5-rank evaluation with respect to flavor and an average value is also shown in Table 5.

(Amount of precipitate)

| | |
| --- | --- |
| Precipitate is rarely observed | 5 |
| Precipitate is slightly observed | 4 |
| Precipitate in a small amount is observed | 3 |
| Precipitation in a fairly large amount is observed | 2 |
| Precipitate in a large amount is observed | 1 |

(Flavor)

| | |
| --- | --- |
| Flavor is good | 7 |
| Flavor is not concerned about | 6 |
| Flavor is rarely concerned about | 5 |
| Flavor is slightly concerned about (Incongruity is somewhat felt.) | 4 |
| Flavor is slightly bad (Unpleasantness is somewhat felt.) | 3 |
| Flavor is fairly bad (Unpleasantness is fairly felt.) | 2 |
| Flavor is vely bad (Unpleasantness is strongly felt.) | 1 |

EXAMPLES 42 TO 80, COMPARATIVE EXAMPLES 27 TO 52

Mineral-enriched milks were obtained in the same manner as in Example 41, except that the inorganic particles-containing additive slurry compositions or the inorganic particles-containing additive powder compositions prepared by Examples 2 to 40 and Comparative Examples 1 to 26 were used and that each mineral concentration was adjusted to the same concentration as in Example 41. The inspection of the precipitate and the sensory test for flavor were performed in the same manner as in Example 41. The results are shown in Tables 5 and 6.

TABLE 5

| | Slurry or powder composition | Amount of precipitate After | | | Flavor |
| --- | --- | --- | --- | --- | --- |
| | | 3 days | 7 days | 14 days | |
| Example 41 | Product of Ex. 1 | 5 | 5 | 5 | 5 |
| Example 42 | Product of Ex. 2 | 5 | 5 | 5 | 4 |
| Example 43 | Product of Ex. 3 | 5 | 5 | 5 | 5 |
| Example 44 | Product of Ex. 4 | 5 | 4 | 4 | 4 |
| Example 45 | Product of Ex. 5 | 4 | 3 | 3 | 6 |
| Example 46 | Product of Ex. 6 | 5 | 4 | 4 | 5 |
| Example 47 | Product of Ex. 7 | 5 | 5 | 5 | 6 |
| Example 48 | Product of Ex. 8 | 5 | 5 | 4 | 7 |
| Example 49 | Product of Ex. 9 | 5 | 5 | 4 | 4 |
| Example 50 | Product of Ex. 10 | 4 | 3 | 3 | 5 |
| Example 51 | Product of Ex. 11 | 5 | 5 | 4 | 7 |
| Example 52 | Product of Ex. 12 | 5 | 5 | 4 | 6 |
| Example 53 | Product of Ex. 13 | 5 | 5 | 4 | 6 |
| Example 54 | Product of Ex. 14 | 5 | 5 | 4 | 6 |
| Example 55 | Product of Ex. 15 | 5 | 5 | 5 | 6 |
| Example 56 | Product of Ex. 16 | 5 | 5 | 5 | 6 |
| Example 57 | Product of Ex. 17 | 5 | 5 | 5 | 6 |
| Example 58 | Product of Ex. 18 | 5 | 5 | 5 | 5 |
| Example 59 | Product of Ex. 19 | 5 | 5 | 5 | 6 |
| Example 60 | Product of Ex. 20 | 5 | 5 | 5 | 6 |
| Example 61 | Product of Ex. 21 | 5 | 5 | 5 | 5 |
| Example 62 | Product of Ex. 22 | 5 | 5 | 5 | 4 |
| Example 63 | Product of Ex. 23 | 5 | 5 | 5 | 5 |
| Example 64 | Product of Ex. 24 | 5 | 4 | 4 | 4 |
| Example 65 | Product of Ex. 25 | 4 | 3 | 3 | 6 |
| Example 66 | Product of Ex. 26 | 5 | 4 | 4 | 5 |
| Example 67 | Product of Ex. 27 | 5 | 5 | 5 | 6 |
| Example 68 | Product of Ex. 28 | 5 | 5 | 4 | 7 |
| Example 69 | Product of Ex. 29 | 5 | 5 | 4 | 4 |
| Example 70 | Product of Ex. 30 | 4 | 3 | 3 | 5 |
| Example 71 | Product of Ex. 31 | 5 | 5 | 4 | 7 |
| Example 72 | Product of Ex. 32 | 5 | 5 | 4 | 6 |
| Example 73 | Product of Ex. 33 | 5 | 5 | 4 | 6 |
| Example 74 | Product of Ex. 34 | 5 | 5 | 4 | 6 |
| Example 75 | Product of Ex. 35 | 5 | 5 | 5 | 6 |
| Example 76 | Product of Ex. 36 | 5 | 5 | 5 | 6 |
| Example 77 | Product of Ex. 37 | 5 | 5 | 5 | 6 |
| Example 78 | Product of Ex. 38 | 5 | 5 | 5 | 5 |
| Example 79 | Product of Ex. 39 | 5 | 5 | 5 | 6 |
| Example 80 | Product of Ex. 40 | 5 | 5 | 5 | 6 |

TABLE 6

| | Slurry or powder composition | Amount of precipitate After | | | Flavor |
| --- | --- | --- | --- | --- | --- |
| | | 3 days | 7 days | 14 days | |
| Comp. Ex. 27 | Product of Comp. Ex. 1 | 5 | 5 | 5 | 3 |
| Comp. Ex. 28 | Product of Comp. Ex. 2 | 5 | 5 | 5 | 1 |
| Comp. Ex. 29 | Product of Comp. Ex. 3 | 5 | 5 | 5 | 1 |
| Comp. Ex. 30 | Product of Comp. Ex. 4 | 4 | 3 | 3 | 2 |
| Comp. Ex. 31 | Product of Comp. Ex. 5 | 5 | 5 | 4 | 3 |
| Comp. Ex. 32 | Product of Comp. Ex. 6 | 4 | 4 | 4 | 3 |
| Comp. Ex. 33 | Product of Comp. Ex. 7 | 5 | 4 | 4 | 2 |
| Comp. Ex. 34 | Product of Comp. Ex. 8 | 5 | 5 | 4 | 3 |
| Comp. Ex. 35 | Product of Comp. Ex. 9 | 2 | 1 | 1 | 4 |
| Comp. Ex. 36 | Product of Comp. Ex. 10 | 2 | 1 | 1 | 4 |
| Comp. Ex. 37 | Product of Comp. Ex. 11 | 5 | 5 | 5 | 3 |

TABLE 6-continued

| | Slurry or powder composition | Amount of precipitate After | | | Flavor |
|---|---|---|---|---|---|
| | | 3 days | 7 days | 14 days | |
| Comp. Ex. 38 | Product of Comp. Ex. 12 | 5 | 5 | 5 | 3 |
| Comp. Ex. 39 | Product of Comp. Ex. 13 | 5 | 5 | 5 | 3 |
| Comp. Ex. 40 | Product of Comp. Ex. 14 | 5 | 5 | 5 | 3 |
| Comp. Ex. 41 | Product of Comp. Ex. 15 | 5 | 5 | 5 | 1 |
| Comp. Ex. 42 | Product of Comp. Ex. 16 | 5 | 5 | 5 | 1 |
| Comp. Ex. 43 | Product of Comp. Ex. 17 | 4 | 3 | 3 | 2 |
| Comp. Ex. 44 | Product of Comp. Ex. 18 | 5 | 5 | 4 | 3 |
| Comp. Ex. 45 | Product of Comp. Ex. 19 | 4 | 4 | 4 | 3 |
| Comp. Ex. 46 | Product of Comp. Ex. 20 | 5 | 4 | 4 | 2 |
| Comp. Ex. 47 | Product of Comp. Ex. 21 | 5 | 5 | 4 | 3 |
| Comp. Ex. 48 | Product of Comp. Ex. 22 | 2 | 1 | 1 | 4 |
| Comp. Ex. 49 | Product of Comp. Ex. 23 | 2 | 1 | 1 | 4 |
| Comp. Ex. 50 | Product of Comp. Ex. 24 | 5 | 5 | 5 | 3 |
| Comp. Ex. 51 | Product of Comp. Ex. 25 | 5 | 5 | 5 | 3 |
| Comp. Ex. 52 | Product of Comp. Ex. 26 | 5 | 5 | 5 | 3 |

EXAMPLE 81

The inorganic particles-containing additive slurry composition prepared by Example 2 which was weighed to be 32 g in terms of calcium, 2.5 Kg of a commercially available cow's milk, 100 g of butter, 1.45 kg of skimmed milk were added into 5 kg of water and homogenized with stirring. After being sterilized and cooled by a normal method, 200 g of a starter preliminarily prepared were inoculated into the mixture, and fermented at 38° C. for 5 hours. After agitation and homogenization, a drink type calcium-enriched yogurt was obtained.

The inspection of the precipitate and the sensory test for flavor were conducted in the same manner as in Example 41. The results are shown in Table 7.

EXAMPLES 82 TO 84, COMPARATIVE EXAMPLES 53 TO 55

Mineral-enriched yogurts were obtained in the same manner as in Example 81, except that the inorganic particles-containing additive slurry compositions or the inorganic particles-containing additive powder compositions prepared by Examples 15, 27 and 40, and Comparative Examples 1, 13 and 24 were used and that each mineral concentration was adjusted to the same concentration as in Example 81. The inspection of the precipitate and the sensory test for flavor were performed in the same manner as in Example 41. The results are shown in Table 7.

TABLE 7

| | Slurry or powder composition | Amount of precipitate After | | | Flavor |
|---|---|---|---|---|---|
| | | 3 days | 7 days | 14 days | |
| Example 81 | Product of Ex. 2 | 4 | 3 | 3 | 4 |
| Example 82 | Product of Ex. 15 | 5 | 5 | 5 | 6 |
| Example 83 | Product of Ex. 27 | 4 | 3 | 2 | 5 |
| Example 84 | Product of Ex. 40 | 5 | 5 | 5 | 6 |
| Comp. Ex. 53 | Product of Comp. Ex. 1 | 4 | 3 | 2 | 2 |
| Comp. Ex. 54 | Product of Comp. Ex. 13 | 5 | 5 | 4 | 3 |
| Comp. Ex. 55 | Product of Comp. Ex. 24 | 5 | 5 | 4 | 3 |

EXAMPLE 85

Using roasted and ground coffee beans, a coffee extract liquid was obtained. To 8 kg of this coffee extract liquid, 220 g of sugar, 2 kg of cow's milk, and the inorganic particles-containing additive slurry composition prepared by Example 2 which was weighed to be 64 g in terms of calcium were mixed and stirred, and further water was added to make up the whole amount of 20 kg, which was further stirred. Adding sodium bicarbonate, the pH was adjusted to 6.7, and a blended solution was obtained by homogenizing. The blended solution was charged in cans, and sterilized by retort for 20 minutes at 123° C., and calcium-enriched canned coffee beverage was obtained.

The inspection of the precipitate and the sensory test of the obtained conned coffee beverage were performed in the same manner as in Example 41. The results are shown in Table 8.

EXAMPLES 86 TO 94, COMPARATIVE EXAMPLES 56 TO 61

Mineral-enriched canned coffee beverages were obtained in the same manner as in Example 85, except that the inorganic particles-containing additive slurry compositions or the inorganic particles-containing additive powder compositions prepared by Examples 10, 16, 17, 20, 28, 30, 35, 38, 39 and Comparative Examples 2, 11, 12, 14, 22, 26 were used and that each mineral concentration was adjusted to the same concentration as in Example 85. The inspection of the precipitate and the sensory test for flavor were performed in the same manner as in Example 41. The results are shown in Table 8.

TABLE 8

| | Slurry or powder composition | Amount of precipitate After | | | Flavor |
|---|---|---|---|---|---|
| | | 30 days | 60 days | 90 days | |
| Example 85 | Product of Ex. 2 | 4 | 3 | 2 | 4 |
| Example 86 | Product of Ex. 10 | 3 | 3 | 2 | 5 |
| Example 87 | Product of Ex. 16 | 5 | 5 | 4 | 6 |
| Example 88 | Product of Ex. 17 | 5 | 5 | 4 | 6 |

TABLE 8-continued

| | Slurry or powder composition | Amount of precipitate After | | | Flavor |
|---|---|---|---|---|---|
| | | 30 days | 60 days | 90 days | |
| Example 89 | Product of Ex. 20 | 5 | 5 | 5 | 6 |
| Example 90 | Product of Ex. 28 | 4 | 3 | 2 | 6 |
| Example 91 | Product of Ex. 35 | 5 | 5 | 4 | 6 |
| Example 92 | Product of Ex. 38 | 5 | 5 | 4 | 5 |
| Example 93 | Product of Ex. 39 | 5 | 5 | 5 | 6 |
| Comp. Ex. 56 | Product of Comp. Ex. 2 | 4 | 3 | 2 | 1 |
| Comp. Ex. 57 | Product of Comp. Ex. 11 | 5 | 4 | 4 | 3 |
| Comp. Ex. 58 | Product of Comp. Ex. 12 | 5 | 4 | 4 | 2 |
| Comp. Ex. 59 | Product of Comp. Ex. 14 | 3 | 3 | 2 | 2 |
| Comp. Ex. 60 | Product of Comp. Ex. 22 | 1 | 1 | 1 | 3 |
| Comp. Ex. 61 | Product of Comp. Ex. 26 | 5 | 5 | 4 | 3 |

As explained above, the inorganic particles-containing additive slurry or powder compositions are especially superior not only in re-dispersibility in liquid and storage stability in liquid for a long period of time, but also in flavor, which is one of the most important factor of foods.

What is claimed is:

1. An inorganic particles-containing additive composition containing a polyvalent metal, a phosphoric acid ion, an organic acid having a carboxyl group and an alkali metal, which satisfies the following requirements of (a) and (b):

$$70 \leq X \leq 90000 \tag{a}$$

X: Amount (mg/Kg) of the alkali metal contained in a solid content of the inorganic particles-containing additive composition, $$0.1 \leq Y \leq 15 \tag{b}$$

Y: Electric conductivity (mS/cm) when the inorganic particles-containing additive composition is adjusted to a solid concentration of 10% by weight.

2. An inorganic particles-containing additive composition containing a polyvalent metal, a phosphoric acid ion, an organic acid having a carboxyl group and an alkali metal, which satisfies the following requirements of (c) and (d):

$$70 \leq X \leq 39000 \tag{c}$$

X: Amount (mg/Kg) of the alkali metal contained in a solid content of the inorganic particles-containing additive composition, $$0.1 \leq Y \leq 7 \tag{d}$$

Y: Electric conductivity (mS/cm) when the inorganic particles-containing additive composition is adjusted to a solid concentration of 10% by weight.

3. An inorganic particles-containing additive composition containing a polyvalent metal, a phosphoric acid ion, an organic acid having a carboxyl group and an alkali metal, which satisfies the following requirements of (e) and (f):

$$150 \leq X \leq 10000 \tag{e}$$

X: Amount (mg/Kg) of the alkali metal contained in a solid content of the inorganic particles-containing additive composition, $$0.25 \leq Y \leq 1.8 \tag{f}$$

Y: Electric conductivity (mS/cm) when the inorganic particles-containing additive composition is adjusted to a solid concentration of 10% by weight.

4. An inorganic particles-containing additive composition containing as a main component at least one of phosphoric acid compounds selected from the group consisting of calcium phosphate, magnesium phosphate and iron phosphate, which comprises a polyvalent metal, a phosphoric acid ion, an organic acid having a carboxyl group and an alkali metal, which is prepared by a method selected from the following (I) to (IV), said additive composition satisfying the following requirements of (a) and (b):

(I) A precursor is prepared by mixing water, a polyvalent metal compound, an organic acid having a carboxyl group and an alkali metal source, and to the precursor, a phosphoric acid source is added;

(II) A precursor is prepared by mixing water, a polyvalent metal compound, a phosphoric acid source and an alkali metal source, or, a phosphoric acid source, alkali metal source, and to the precursor, an organic acid having a carboxyl group is added;

(III) A precursor is prepared by mixing water, a polyvalent metal compound and an organic acid having a carboxyl group, and to the precursor, a phosphoric acid source.alkali metal source is added;

(IV) A precursor is prepared by mixing water, a polyvalent metal compound, an organic acid having a carboxyl group and a phosphoric acid source, and to the precursor, an alkali metal source is added;

$$70 \leq X \leq 90000 \tag{a}$$

X: Amount (mg/Kg) of the alkali metal contained in a solid content of the inorganic particles-containing additive composition, $$0.1 \leq Y \leq 15 \tag{b}$$

Y: Electric conductivity (mS/cm) when the inorganic particles-containing additive composition is adjusted to a solid concentration of 10% by weight.

5. An inorganic particles-containing additive composition further containing 2 to 80 parts by weight of an emulsification stabilizer to 100 parts by weight of a solid content of the inorganic particles-containing additive composition according to any one of claims 1–4.

6. A food composition containing the inorganic particles-containing additive composition according to claim 5.

7. An inorganic particles-containing additive composition according to any one of claims 1 to 4, wherein a weight-average diameter K ($\mu$m) is $0.02 \leq k \leq 0.8$.

8. An inorganic particles-containing additive composition according to any one of claims 1 to 4, in use for foods.

9. A food composition containing the inorganic particles-containing additive composition according to any one of claims 1 to 4.

* * * * *